// United States Patent [15] 3,702,427
Learn et al. [45] Nov. 7, 1972

[54] ELECTROMIGRATION RESISTANT METALLIZATION FOR INTEGRATED CIRCUITS, STRUCTURE AND PROCESS

[72] Inventors: Arthur J. Learn, Cupertino; William H. Shepherd; Conrad J. Dellioca, both of Palo Alto, all of Calif.

[73] Assignee: Fairchild Camera Instrument Corporation, Mountain View, Calif.

[22] Filed: Feb. 22, 1971

[21] Appl. No.: 117,477

[52] U.S. Cl. ........317/234 R, 317/234 J, 317/234 N, 174/68.5, 29/198, 29/589, 204/15

[51] Int. Cl. ............................H01l 3/00, H01l 5/00

[58] Field of Search.......317/234, 235, 46, 31, 5, 5.4, 317/1; 174/68.5; 29/183.5, 195, 589, 590; 204/15; 117/206

[56] References Cited

UNITED STATES PATENTS

| | | | |
|---|---|---|---|
| 3,533,160 | 10/1970 | Cunningham et al. | 317/234 N |
| 3,558,992 | 1/1971 | Heuner et al. | 317/234 N |
| 2,634,322 | 4/1953 | Law | 317/235 UA |
| 2,680,220 | 6/1954 | Starr et al. | 317/235 UA |
| 3,351,825 | 11/1967 | Vidas | 317/235 A |

*Primary Examiner*—John W. Huckert
*Assistant Examiner*—Andrew J. James
*Attorney*—Roger S. Rorovoy, Alan H. MacPherson and Charles L. Botsford

[57] ABSTRACT

The exposed surfaces of metal leads formed on an integrated circuit wafer are anodized to reduce electromigration.

6 Claims, 2 Drawing Figures

PATENTED NOV 7 1972 3,702,427

INVENTORS
ARTHUR J. LEARN
WILLIAM H. SHEPHERD
CONRAD J. DELL'OCA
BY Alan H. MacPherson
ATTORNEY

ELECTROMIGRATION RESISTANT METALLIZATION FOR INTEGRATED CIRCUITS, STRUCTURE AND PROCESS

BACKGROUND OF THE INVENTION

1. Field of the Invention

This invention relates to metal leads suitable for use in interconnecting the circuit elements of an integrated circuit and in particular to a metal lead structure, which is substantially resistant to electromigration effects and to a process for producing these leads.

2. Prior Art

Electromigration is the term applied to the movement of metal ions in one direction and vacancies in another direction arising as a consequence of current passage through a metal. In semiconductor integrated circuits, circuit elements are interconnected by metal leads. These metal leads are small in size, typically being about one micron thick and 10 to 25 microns wide. Electromigration is a problem of particular consequence in such leads by virtue of the large current densities on the order of $10^5$ amps per square centimeter and elevated temperatures frequently encountered by these leads. Electromigration-induced movement of metal ions and vacancies eventually creates a deficiency of material at some point in the lead, ultimately resulting in an electrically-open lead and circuit failure.

The extent of electromigration depends, among other things, upon the current density through the lead, the temperature of the lead and the activation energy for self-diffusion in the lead material. In polycrystalline, thin-film material, electromigration is also sensitive to the grain structure (i.e. grain size, grain size distribution and grain orientation). These factors depend on the substrate temperature during deposition of the lead metal and the deposition rate. Material movement occurs primarily in grain boundaries where a low self-diffusion activation energy is noted. In addition, grain boundaries act as sources for, or sinks for, ions and vacancies. When the grain boundary acts as a source for ions (sink for vacancies) eventually a deficiency of material (accumulation of vacancies) occurs at the grain boundary leading to void precipitation. As the void grows larger, the rate of electromigration in the vicinity of the void accelerates. An open circuit occurs when the void grows across the lead width.

The electromigration problem is discussed by James R. Black in a paper entitled "Electromigration — A Brief Survey and Some Recent Results" IEEE Transactions on Electron Devices, Vol. ED—16, No. 4, April 1969, Page 338. See also a similar paper by Black in the proceedings of the IEEE, Vol. 57, No. 9, September 1969, entitled "Electromigration Failure Modes in Aluminum Metalization in Semiconductor Devices". In the former paper, at page 341, Black discusses an attempt to reduce the electromigration effect by coating aluminum films with a chemically-vapor-deposited layer of $SiO_2$. In the presence of the dielectric coating, lifetime before electromigration-induced failure was increased by a factor of 2 to 3 at high temperature (220° C) with a current density of $10^6$ amps per square centimeter.

SUMMARY OF THE INVENTION

This invention reduces electromigration effects in metal leads by anodizing the exposed surfaces of these leads. The anodized material is an insulator. The unanodized core of the lead conducts current. Unlike deposited layers, anodization provides a dense film which covers the exposed surface. These properties in turn inhibit vacancy formation or inward vacancy diffusion.

This invention increases the lifetime of typical aluminum leads by an order of magnitude at high temperature (220° C) with a current density of $10^6$ amps per square centimeter. This improvement in lifetime is believed due, at least in part, to the increased activation energy required for electromigration as a result of anodization. The lifetime enhancement is considerably more pronounced at lower temperatures. While this invention will be described in conjunction with aluminum leads, the procedure can be used with any anodizable metal lead structure to reduce electromigration.

DETAILED DESCRIPTION

Figure 1A:
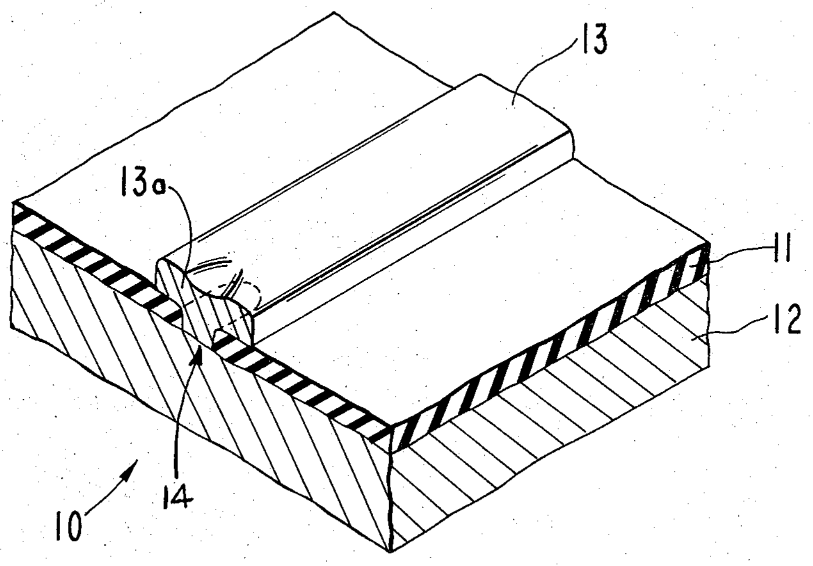
FIG. 1*a* shows an isometric view of a portion of a semiconductor wafer containing on one surface a layer of insulation with a metal lead adherent to the insulation.

FIG. 1*a* shows a portion of a typical prior art semiconductor structure. Wafer 10 comprises a body of semiconductor material 12, on which is placed a layer of insulation 11. Typically semiconductor material 12 is of silicon and insulation 11 is a layer of silicon dioxide. Throughout this specification, for convenience the invention will be described in terms of a silicon substrate and a silicon dioxide insulation layer with a single aluminum lead formed thereon. It should be understood, however, that other combinations of semiconductor material, insulation and conductive lead material are appropriate for use with this invention.

Metal lead 13 adheres to the top surface of insulation 11. Lead 13 connects one circuit element (not shown) formed as part of the integrated circuit either within semiconductor material 12 or on the surface of insulation 11, with another circuit element. Lead **13*a* contacts semiconductor material 12 through a typical window 14 in insulation 11**.

Figure 1B:
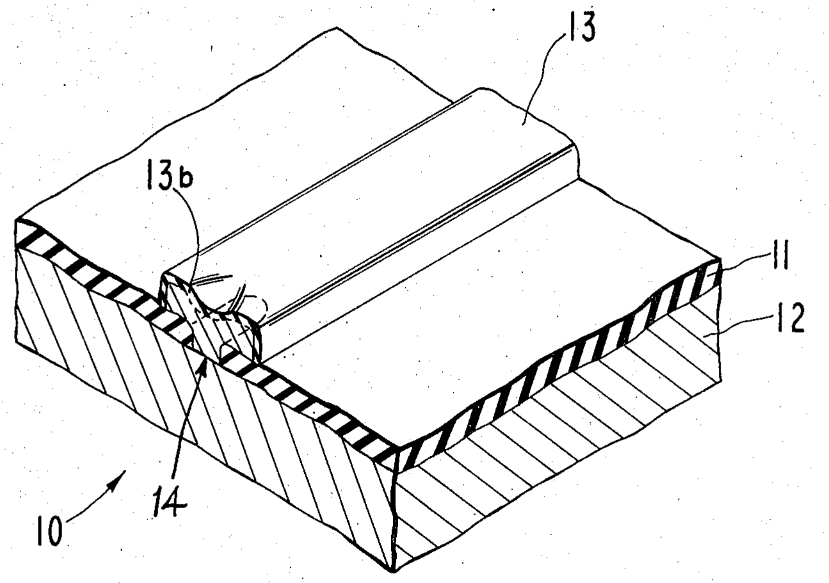
FIG. 1*b* shows the structure of FIG. 1*a* with the metal lead anodized according to the techniques of this invention.

As experienced in the prior art and discussed in the above-cited articles, electromigration effects often occur in lead 13 resulting in the formation of an open circuit. To overcome this phenomenon the structure of FIG. 1*b* is produced in accordance with this invention. FIG. 1*b* shows structure identical to that of FIG. 1*a* except that metal layer 13 now is covered by an anodic aluminum oxide layer 13 b. This layer is formed by anodization of the outer surface of lead 13. An anodic oxide film can be formed on aluminum by placing the aluminum in any one of various electrolytic solutions, including aqueous or non-aqueous electrolytes, fused salts or an oxygen plasma. When an oxygen plasma is used, the process is normally referred to as plasma anodization. The nature of the oxide layer produced by anodization is such that it consists of an inner part, next to the metal, which is dense and normally referred to as barrier oxide and an outer part which is porous. This porous outer part may or may not be formed depending on the anodization conditions and whether or not the electrolyte slowly dissolves or etches the forming oxide.

In one particular case a 3percent tartaric acid solution with PH adjusted to 5.5 by adding ammonium hydroxide, was used at 25° C. Anodization was carried out at constant current density of 15 ma / cm$^2$ until a preset voltage was reached at which point this preset voltage was maintained until the current density dropped to some low level. One preset voltage used was 120 volts. This voltage gave an anodic thickness of about 0.15 microns. With a preset voltage of 160 volts, an anodic thickness of about 0.20 microns was obtained.

A variety of factors, such as anodizing current and voltage and electrolyte strength and temperature, influence the thickness of the anodized layer. However, one feature common to all anodic layers produced in accordance with this invention, regardless of thickness, is the existence of a barrier layer as the inner part of the anodic layer. This barrier layer is commonly no greater than 5,000 angstroms in thickness.

The aluminum anodization reduces electromigration because it is thought to reduce the supply of vacancies necessary to the electromigration process and to the formation and growth of voids. This is theory only, however, and is not proven.

What is claimed is:

1. In a semiconductor circuit structure comprising semiconductor material containing selected circuit elements, insulation on said semiconductor material and metal lead structure adherent to said insulation; said metal lead structure interconnecting selected circuit elements in said semiconductor material, the improvement which comprises:

means for preventing electromigration in said metal lead structure comprising an anodized layer formed from the exposed surfaces of said lead structure, those portions of each lead more than a given distance beneath the exposed surface of each lead remaining unanodized and thus electrically conductive.

2. Structure as in claim 1 wherein said anodized layer comprises an inner barrier layer.

3. Structure as in claim 2 wherein said structure is of aluminum.

4. Structure as in claim 3 wherein said anodized barrier layer is no greater than 0.5 microns thick.

5. structure as in claim 4 wherein said anodized barrier layer is on the order of 0.15 microns thick.

6. The method of producing an integrated circuit comprising the steps of:

a. forming a layer of insulation on one surface of a semiconductor wafer;

b. forming circuit elements within said wafer, said circuit elements extending to said layer of insulation;

c. forming a metal lead interconnect pattern on, and adherent to, said layer of insulation, said metal lead interconnect pattern interconnecting said circuit elements to form a circuit; and d. anodizing the exposed surfaces of said metal lead interconnect pattern, leaving unanodized and thus electrically conductive, the inner portions of each lead in the metal lead interconnect pattern.

* * * * *